No. 663,009. Patented Dec. 4, 1900.
W. B. CANNON.
COUPLING DEVICE.
(Application filed Feb. 6, 1900.)

(No Model.)

Witnesses:
Alice Houghton
Otis A. Earl

Inventor,
Warren B. Cannon
By Fred L. Chappell
Att'y.

THE NORRIS PETERS CO., PHOTO-LITHO., WASHINGTON, D. C.

UNITED STATES PATENT OFFICE.

WARREN B. CANNON, OF KALAMAZOO, MICHIGAN, ASSIGNOR OF ONE-THIRD TO HOMER MANVEL, OF SAME PLACE.

COUPLING DEVICE.

SPECIFICATION forming part of Letters Patent No. 663,009, dated December 4, 1900.

Application filed February 6, 1900. Serial No. 4,187. (No model.)

*To all whom it may concern:*

Be it known that I, WARREN B. CANNON, a citizen of the United States, residing at the city of Kalamazoo, in the county of Kalamazoo and State of Michigan, have invented certain new and useful Improvements in Coupling Devices, of which the following is a specification.

This invention relates to improvements in couplings for hoops or bands for tanks, tank-silos, tubs, or for bands for any similar purpose.

The objects of the invention are, first, to provide a simple and efficient means of joining the ends of hoops or bands together without the necessity of riveting the same; second, to provide a means of so joining the ends that they may be easily detached; third, to provide such a coupling means which can be conveniently and effectively used in connection with a tightening-bolt, and, fourth, to provide a simple and efficient coupling for the ends of a hoop or band which will not interfere with the driving of the hoop on a tank or barrel to draw the staves closely together.

A still further object is to simplify the construction and provide a coupling which does not injure the tensile strength of the band or hoop, but preserves it to the fullest extent without the use of rivets, welding, or similar means and which may be readily and conveniently applied without the use of special appliances.

Further objects will definitely appear in the detailed description to follow.

I accomplish these objects of my invention by the devices and means described in this specification.

The invention is clearly defined and pointed out in the claims.

A structure embodying my invention is clearly illustrated in the accompanying drawings, forming a part of this specification, in which—

Figure 1:
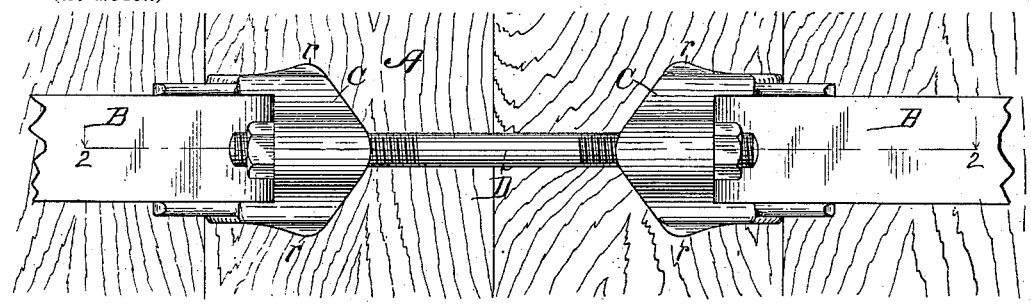
Figure 2:
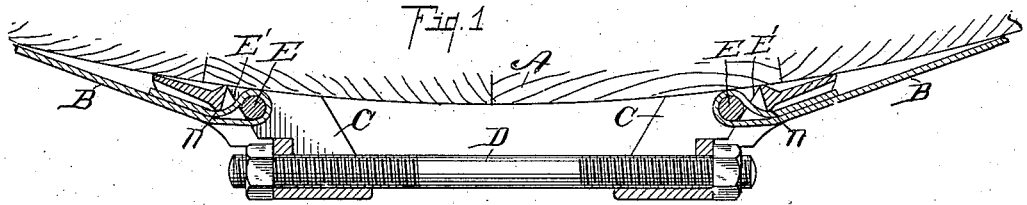
Figure 4:
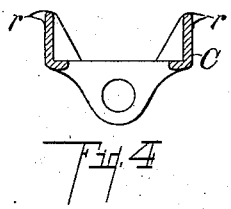
Figure 3:
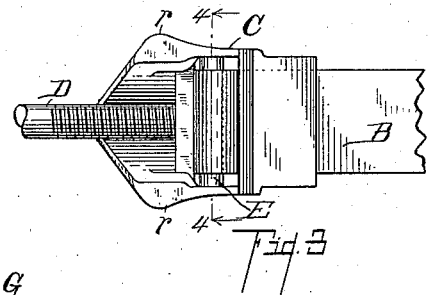
Figure 5:
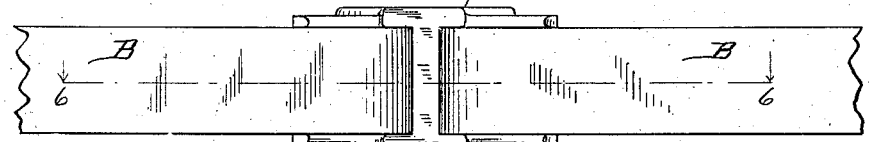
Figure 6:
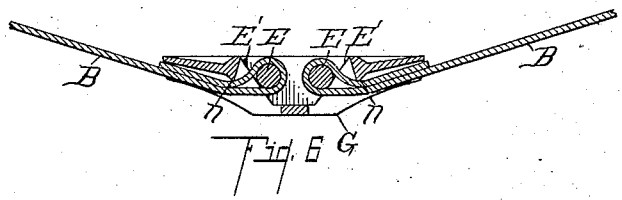

Figure 1 is a detail elevation view of my improved coupling device in position, the same being adapted for use with a tightening-bolt. Fig. 2 is a detail longitudinal horizontal sectional elevation of the same, taken on line 2 2 of Fig. 1. Fig. 3 is a detail inside elevation view of one end of the coupling device. Fig. 4 is a transverse detail sectional view of one lug or member, taken on line 4 4 of Fig. 3. Fig. 5 is a detail view of a modification of the device in which no tightening-bolt is used. Fig. 6 is a longitudinal horizontal sectional view taken on line 6 6 of Fig. 5.

In the drawings all of the sectional views are taken looking in the direction of the little arrows at the ends of the section-lines, and similar letters of reference refer to similar parts throughout the several views.

Referring to the lettered parts of the drawings, A represents a tank, tub, or other similar receptacle composed of staves in the usual manner.

B B represent the ends of the hoop or band embracing the same.

C C represent the end brackets or "lugs" of my improved coupling, which are joined together by a bolt D, having a screw-threaded nut for tightening the same. The lug C has side or cheek pieces connected by an outer and inner web, the outer containing suitable perforations for the tension-bolt D, to which I have referred. Where the sides of the lug come in contact with the tank or tub they are curved slightly and have outwardly-extending projections $r$ to make it possible to drive the same without their gouging into the staves. Within the side or cheek pieces of the lug are inclined ways E'. On the inner web joining the sides is a little transverse ridge $n$.

In use the end of the band or hoop is folded inward upon itself around a pin E, which is of sufficient length to rest between the side or cheek pieces of the lug and engage the inclined ways E'. The end of the band or hoop B is folded to the inside and inserted through the central aperture of the lug and the pin E inserted through the loop when the hoop is drawn back into place. As tension is put on the band by tightening the bolt D or driving the hoop it draws the same so that the ridge $n$ clamps the free end of the band securely against the outer portion of the band, and as the strain is increased it carries the pin E along the inclined portion E', clamping the parts more securely.

It will be observed that the texture of the band is uninjured by any sharp bends, it embracing over the pin E in a fold, which pin engages the inclines within the lug, so that the full strength of the band or hoop is utilized.

In practice it is found that the ridge $n$ insures a more perfect action, though I have found by experience that it is not absolutely essential.

Where the coupling-bolt is used, the lugs are very easily put upon the band or hoop after it is in position. The bolt is then inserted and the same tightened up, when the band can be driven tight and by so doing greatly increase its tension. However, the invention is adapted for use independent of any tightening-bolt, as appears in the structure appearing in Fig. 6, where the outer web portion of each lug is joined together, and in that event the hoop or band is coupled before it is put over the staves, when it can be driven down tight into position, owing to the special structure which I have mentioned in this connection, the same being used as though the ends of the hoop were joined together by rivets in the usual way.

I desire to state that I have shown my improved coupling device or lugs in what practical use demonstrates thus far to be the best form, though my experience indicates that the same can be made in other forms and be quite effective. The coupling device will be quite effective if it is not made with the inclines E', although they are valuable and insure its effective action, and the exact method of joining the lugs together is not an absolute essential, as appears in the description referred to. It might where broad bands are coupled together be desirable to provide the same without other means than the single bolt D, which I have here described.

Having thus described my invention, what I claim as new, and desire to secure by Letters Patent, is—

1. In a coupling device for hoops or bands, the combination of a pair of "lugs" C having sides or cheeks joined together by an outer and inner web; inclined ways E' on said cheeks; a pin E arranged between the cheeks and engaging the said inclined ways; a hoop or band looped inwardly around said pin; an outwardly-projecting ridge $n$ on the inner web; and a screw-threaded bolt for joining and drawing the "lugs" together, all coacting substantially as described for the purpose specified.

2. In a coupling device for hoops or bands, the combination of a pair of "lugs" C having sides or cheeks joined together by an outer and inner web; inclined ways E' on said cheeks; a pin E arranged between the cheeks and engaging said inclined ways; a hoop or band looped inwardly around said pin; and a screw-threaded bolt for joining and drawing the "lugs" together, all coacting for the purpose specified.

3. In a coupling device for hoops or bands, the combination of a pair of "lugs" C having sides or cheeks joined together by an outer and inner web; a pin E arranged and engaged between the cheeks; a hoop or band looped inwardly around said pin; and a screw-threaded bolt for joining and drawing the "lugs" together, all coacting for the purpose specified.

4. In a coupling device for hoops or bands, the combination of a pair of "lugs" C having sides or cheeks joined together by an outer and inner web; a pin E arranged and engaged between the cheeks; a hoop or band looped inwardly around said pin; and means for joining and drawing the "lugs" together, all coacting for the purpose specified.

5. In a coupling device for hoops or bands, the combination of a pair of "lugs" C having sides or cheeks joined together by a web; inclined ways E' on said cheeks; a pin E arranged between the cheeks and engaging the said inclined ways; a hoop or band looped inwardly around said pin; an outwardly-projecting ridge $n$ on the inner web; and a screw-threaded bolt for joining and drawing the "lugs" together, all coacting for the purpose specified.

6. In a coupling device for hoops or bands, the combination of a pair of "lugs" C having sides or cheeks joined together by a web; inclined ways E' on said cheeks; a pin E arranged between the cheeks and engaging said inclined ways; a hoop or band looped inwardly around said pin; and a screw-threaded bolt for joining and drawing the "lugs" together, all coacting for the purpose specified.

7. In a coupling device for hoops or bands, the combination of a pair of "lugs" C having sides or cheeks joined together by a web; a pin E arranged and engaged between the cheeks; a hoop or band looped inwardly around said pin; and a screw-threaded bolt for joining and drawing the "lugs" together, all coacting for the purpose specified.

8. In a coupling device, for hoops or bands, the combination of a pair of "lugs" C having sides or cheeks joined together by a web; a pin E arranged and engaged between the cheeks; a hoop or band looped inwardly around said pin; and means for joining and drawing the "lugs" together, all coacting for the purpose specified.

9. In a coupling device, a "lug" having sides or cheeks having inclined ways E'; the said cheeks being joined together by a suitable web, said web having a transverse ridge $n$ thereon; a pin E adapted to extend between the cheeks and engage the inclined ways on each side and engage within a fold of a band or hoop, the free end of which rests upon the said web as specified.

10. In a coupling device, a "lug" having sides or cheeks having inclined ways E'; the said cheeks being joined together by a suitable web; a pin E adapted to extend between the cheeks and engage the inclined ways on each side and engage within a fold of a band or hoop, the free end of which rests upon the said web as specified.

11. In a coupling device, a "lug" having sides or cheeks joined together by a suitable web; a pin E arranged between the cheeks and engaging the same and adapted to receive a fold or loop in a band or hoop, the free end of which rests upon said web, as specified.

In witness whereof I have hereunto set my hand and seal in the presence of two witnesses.

WARREN B. CANNON. [L. S.]

Witnesses:
MARY GIDNER,
OTIS A. EARL.